US012606087B2

(12) United States Patent
Back et al.

(10) Patent No.: US 12,606,087 B2
(45) Date of Patent: Apr. 21, 2026

(54) SMART VEHICLE FIRE WARNING SYSTEM

(71) Applicant: GM GLOBAL TECHNOLOGY OPERATIONS LLC, Detroit, MI (US)

(72) Inventors: Bongbum Back, Incheon (KR); Insuk Yang, Gyeonggi-do (KR); Hyoungchan Koo, Songpa-gu (KR); Seokju Yong, Bucheon-si (KR); Russell A. Patenaude, Macomb Township, MI (US); Ryan Patrick Hickey, Austin, TX (US); Younghoon Kim, Incheon (KR)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 42 days.

(21) Appl. No.: 18/672,915

(22) Filed: May 23, 2024

(65) Prior Publication Data

US 2025/0360873 A1     Nov. 27, 2025

(51) Int. Cl.
*B60Q 9/00*     (2006.01)
*B60W 30/18*     (2012.01)
*H04M 1/72421*     (2021.01)

(52) U.S. Cl.
CPC ......... *B60Q 9/00* (2013.01); *B60W 30/18009* (2013.01); *H04M 1/72421* (2021.01); *B60W 2420/54* (2013.01); *B60W 2530/00* (2013.01); *B60W 2530/20* (2013.01); *B60W 2555/00* (2020.02)

(58) Field of Classification Search
CPC ..................... B64D 2045/009; B60R 16/0237; B60Q 9/00; B60W 50/0205; B60W 2556/45; B60W 50/08; B60W 40/02; B60W 60/0015; G06V 20/56; H04W 4/90; H04W 4/40
See application file for complete search history.

(56) References Cited

U.S. PATENT DOCUMENTS

| | | | | |
|---|---|---|---|---|
| 9,355,541 B1 * | 5/2016 | Lewinski | ............... | G08B 17/10 |
| 9,956,443 B1 * | 5/2018 | Cutting | ................... | A62C 3/00 |
| 2017/0213462 A1 * | 7/2017 | Prokhorov | ............ | G08G 1/166 |
| 2017/0351254 A1 * | 12/2017 | Listwin | ............... | G05D 1/0022 |
| 2019/0226856 A1 | 7/2019 | Ghannam et al. | | |
| 2020/0189764 A1 * | 6/2020 | Esimai | ............... | B64D 45/0031 |
| 2021/0283440 A1 * | 9/2021 | Lee | .......................... | A62C 3/07 |

(Continued)

FOREIGN PATENT DOCUMENTS

| | | |
|---|---|---|
| CN | 113085867 A | 11/2022 |
| DE | 102023125482 A1 | 4/2024 |

*Primary Examiner* — Hitesh Patel
(74) *Attorney, Agent, or Firm* — Ingrassia Fisher & Lorenz, LLP | IF&L

(57) ABSTRACT

Methods and systems are provided for smart vehicle warning systems. In an exemplary embodiment, in another exemplary embodiment, a vehicle is provided that includes a body, a drive system, one or more sensors, and a processor. The drive system is configured to move the body. The one or more sensors are configured to obtain sensor data pertaining to the vehicle and its surroundings. The processor is coupled to the one or more sensors, and is configured to at least facilitate determining that is coupled to the one or more vehicle sensors, whether a fire event is likely to be occurring related to the vehicle, using the sensor data; and taking an action when it is determined that the fire event is likely to be occurring.

13 Claims, 4 Drawing Sheets

(56) References Cited

U.S. PATENT DOCUMENTS

| | | | |
|---|---|---|---|
| 2021/0350691 A1* | 11/2021 | Shah | G08B 25/10 |
| 2021/0405185 A1* | 12/2021 | Price | G01S 13/931 |
| 2022/0084323 A1* | 3/2022 | Karlin | G06Q 40/08 |

* cited by examiner

SMART VEHICLE FIRE WARNING SYSTEM

TECHNICAL FIELD

The technical field generally relates to the vehicles, including the detection and warning as to fire events.

BACKGROUND

Many vehicles today have warning systems that provide warnings pertaining to one or more vehicle states or conditions. However, existing techniques may not always be optimal in certain circumstances, for example pertaining to certain events that may occur within or in proximity to the vehicle.

Accordingly, it is desirable to provide improved methods and systems for providing warnings as to fire events pertaining to a vehicle. Furthermore, other desirable features and characteristics of the present invention will become apparent from the subsequent detailed description of the invention and the appended claims, taken in conjunction with the accompanying drawings and this background of the invention.

SUMMARY

In accordance with an exemplary embodiment, a method is provided that includes obtaining, via one or more vehicle sensors of a vehicle, sensor data pertaining to the vehicle and its surroundings; determining, via a processor that is coupled to the one or more vehicle sensors, whether a fire event is likely to be occurring related to the vehicle, using the sensor data; and taking an action when it is determined that the fire event is likely to be occurring.

Also in an exemplary embodiment, the method further include determining, via the processor, whether the fire event is occurring within the vehicle or outside from the vehicle; wherein the action is based at least in part on whether the fire event is determined to be occurring within the vehicle or outside the vehicle.

Also in an exemplary embodiment, the method further includes determining, via the processor, a direction of the fire event with respect to the vehicle, when it is determined that the fire event is occurring outside the vehicle; wherein the action is based at least in part on the direction of the fire event with respect to the vehicle.

Also in an exemplary embodiment, the method further includes determining, via the processor, a confidence level associated with the determination as to whether the fire event is likely to be occurring related to the vehicle; wherein the action is based at least in part on the confidence level.

Also in an exemplary embodiment, the step of taking the action includes providing a notification to a fire authority in addition to a user of the vehicle.

Also in an exemplary embodiment, the step of taking the action further includes automatically moving the vehicle, in accordance with instructions provided by the processor.

Also in an exemplary embodiment, the sensor data includes sensor data of a plurality of different modalities, including tire pressure monitoring sensor data, ultrasonic sensor data, exterior temperature sensor data, and interior temperature sensor data.

In another exemplary embodiment, a system is provided that includes one or more vehicle sensors of a vehicle and a processor. The one or more vehicle sensors are configured to obtain sensor data pertaining to the vehicle and its surroundings. The processor is coupled to the one or more vehicle sensors and that is configured to at least facilitate determining that is coupled to the one or more vehicle sensors, whether a fire event is likely to be occurring related to the vehicle, using the sensor data; and taking an action when it is determined that the fire event is likely to be occurring.

Also in an exemplary embodiment, the processor is further configured to at least facilitate determining whether the fire event is occurring within the vehicle or outside from the vehicle; wherein the action is based at least in part on whether the fire event is determined to be occurring within the vehicle or outside the vehicle.

Also in an exemplary embodiment, the processor is further configured to at least facilitate determining a direction of the fire event with respect to the vehicle, when it is determined that the fire event is occurring outside the vehicle; wherein the action is based at least in part on the direction of the fire event with respect to the vehicle.

Also in an exemplary embodiment, the processor is further configured to at least facilitate determining a confidence level associated with the determination as to whether the fire event is likely to be occurring related to the vehicle; wherein the action is based at least in part on the confidence level.

Also in an exemplary embodiment, the processor is further configured to at least facilitate providing a notification to a fire authority in addition to a user of the vehicle.

Also in an exemplary embodiment, the processor is further configured to at least facilitate automatically moving the vehicle, in accordance with instructions provided by the processor.

Also in an exemplary embodiment, the sensor data includes sensor data of a plurality of different modalities, including tire pressure monitoring sensor data, ultrasonic sensor data, exterior temperature sensor data, and interior temperature sensor data.

In another exemplary embodiment, a vehicle is provided that includes a body, a drive system, one or more sensors, and a processor. The drive system is configured to move the body. The one or more sensors are configured to obtain sensor data pertaining to the vehicle and its surroundings. The processor is coupled to the one or more sensors, and is configured to at least facilitate determining that is coupled to the one or more vehicle sensors, whether a fire event is likely to be occurring related to the vehicle, using the sensor data; and taking an action when it is determined that the fire event is likely to be occurring.

In another exemplary embodiment, the vehicle of claim 8, wherein the processor is further configured to at least facilitate determining whether the fire event is occurring within the vehicle or outside from the vehicle; and determining a direction of the fire event with respect to the vehicle, when it is determined that the fire event is occurring outside the vehicle; wherein the action is based at least in part on whether the fire event is determined to be occurring within the vehicle or outside the vehicle and also based at least in part on the direction of the fire event with respect to the vehicle; and wherein the action further includes providing a notification to a fire authority in addition to a user of the vehicle; and automatically moving the vehicle, in accordance with instructions provided by the processor.

In another exemplary embodiment, the sensor data includes sensor data of a plurality of different modalities, including tire pressure monitoring sensor data, ultrasonic sensor data, exterior temperature sensor data, and interior temperature sensor data.

Also in an exemplary embodiment, the processor is further configured to at least facilitate determining a confidence level associated with the determination as to whether the fire event is likely to be occurring related to the vehicle, wherein the confidence level is based on each of the plurality of different modalities, including the tire pressure monitoring sensor data, the ultrasonic sensor data, exterior temperature sensor data, and the interior temperature sensor data; wherein the action is based at least in part on the confidence level.

Also in an exemplary embodiment, the confidence level is selected from one of the following: a high confidence level that is consistent with the following: (a) a high noise level of the ultrasonic sensor data that is greater than a noise level threshold and that lasts for more than a predetermined amount of time; a high exterior temperature sensor data value that is greater than a first temperature threshold; (c) a high TPMS value sensor data 406 value that is greater than approximately the first temperature threshold per second; and (d) a high internal temperature sensor data value that is greater than the first temperature threshold; a medium confidence level that is consistent with the following: (a) the high noise level of the ultrasonic sensor data that is greater than the noise level threshold and that lasts for more than the predetermined amount of time; (b) a medium exterior temperature sensor data value that is less than the first temperature threshold and greater than a second temperature threshold; (c) a medium TPMS value sensor data value that is less than the first temperature threshold and greater than the second temperature threshold; and (d) a medium internal temperature sensor data value that is less than the first temperature threshold and greater than the second temperature threshold; and a low confidence level that is consistent with the following: (a) a high noise level of the ultrasonic sensor data but that lasts for less than the predetermined amount of time; (b) a low exterior temperature sensor data value that is less than the second predetermined threshold; (c) a low TPMS value sensor data value that is less than the second predetermined threshold per second; and (d) a low internal temperature sensor data value that is less than the second predetermined threshold.

Also in an exemplary embodiment, the confidence level is selected from one of the following: (1) a high confidence level that is consistent with the following: (a) a high noise level of the ultrasonic sensor data that is greater than a noise level threshold and that lasts for more than a predetermined amount of time; a high exterior temperature sensor data value that is greater than approximately 300 degrees Celsius; (c) a high TPMS value sensor data 406 value that is greater than approximately 300 degrees Celsius per second; and (d) a high internal temperature sensor data value that is greater than 300 degrees Celsius; (2) a medium confidence level that is consistent with the following: (a) the high noise level of the ultrasonic sensor data that is greater than the noise level threshold and that lasts for more than the predetermined amount of time; (b) a medium exterior temperature sensor data value that is approximately 200 degrees Celsius; (c) a medium TPMS value sensor data value that is approximately equal to 200 degrees Celsius; and (d) a medium internal temperature sensor data value that is approximately 200 degrees Celsius; and (3) a low confidence level that is consistent with the following: (a) a high noise level of the ultrasonic sensor data but that lasts for less than the predetermined amount of time; (b) a low exterior temperature sensor data value that is approximately equal to 100 degrees Celsius; (c) a low TPMS value sensor data value that is approximately equal to 100 degrees Celsius per second; and (d) a low internal temperature sensor data value that is approximately 100 degrees Celsius per second.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
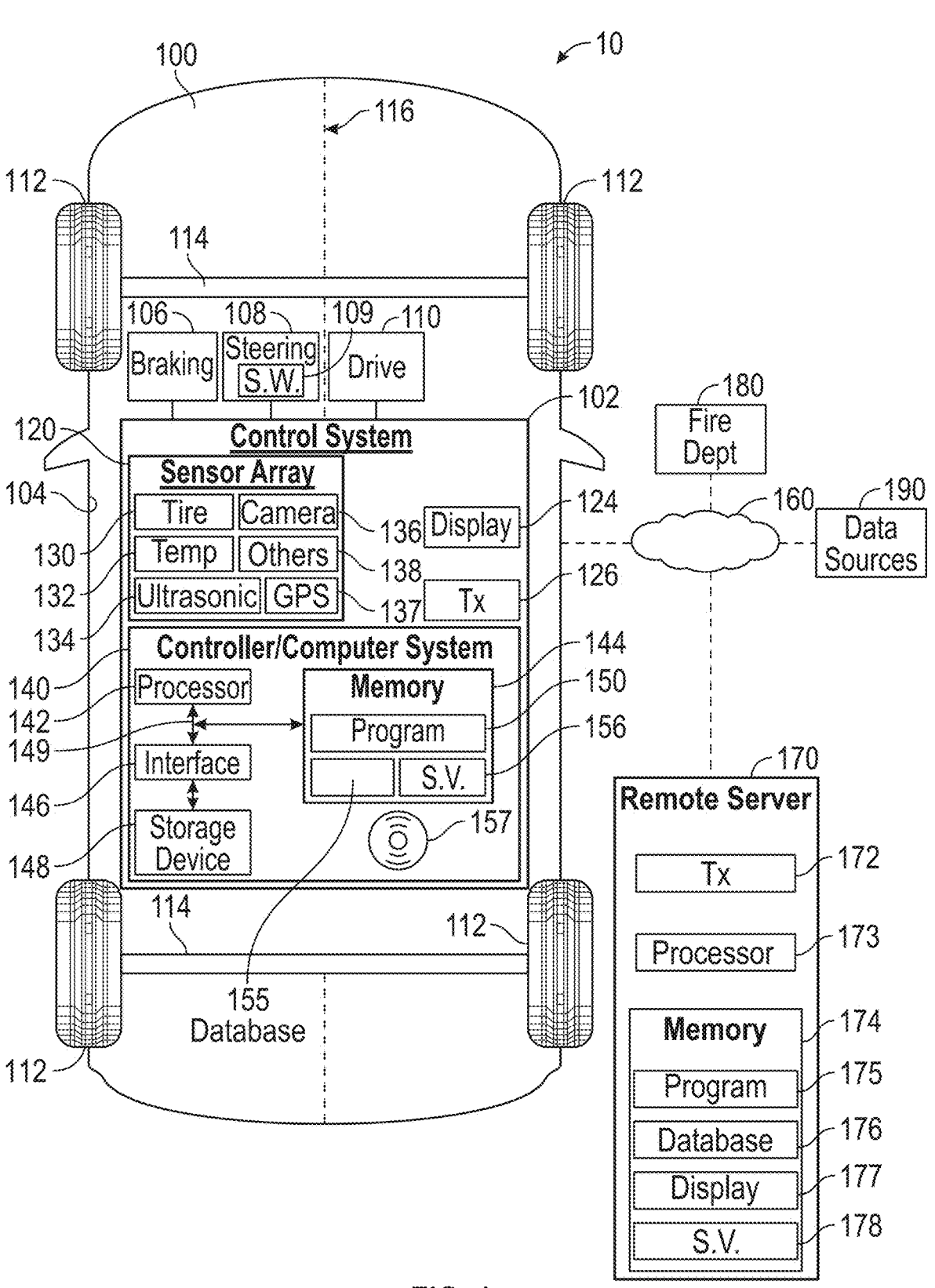
FIG. 1 is a functional block diagram of a system, including a vehicle that is configured for providing warnings pertaining to fire events pertaining to the vehicle and/or other nearby vehicles, in accordance with an exemplary embodiment.

FIG. 1 illustrates a system 10. In various embodiments, and as described below, the system 10 includes one or more vehicles 100 and a remote server 170. In certain embodiments, the system 10 further includes and/or is coupled to one or more fire authorities 180 (e.g., a fire department, fire station, or the like) and/or data sources 190 (e.g., infrastructure and/or other potential sources of data, e.g., as to other vehicles, circumstances, and/or other conditions surrounding and/or pertaining to the vehicle 100). In certain embodiments, the vehicle 100 is representative of a particular vehicle 100 that is surrounded by various other vehicles that are in proximity to the vehicle 100 (e.g., in a parking lot).

In various embodiments, the system 10 provides warnings and other actions pertaining to fire events pertaining to the vehicle 100 and/or other nearby vehicles, and that implemented in connection with the communications network 160, remote server 170, fire authorities 180, and/or data sources 190 of FIG. 1. In various embodiments, the system 10 performs these tasks in accordance with the process 200 of FIG. 2 and the implementations thereof of FIGS. 3 and 4, in accordance with exemplary embodiments.

Specifically, as described in greater detail further below, in various embodiments the vehicle 100 includes a control system 102 that collects data, makes determinations, and provides warnings pertaining to potential fire events pertaining to the vehicle 100, such as those that may be occurring within the vehicle 100 and/or in proximity thereto (e.g., within other nearby vehicles and/or otherwise in proximity to the vehicle 100, such as within the same parking lot or the like). In various embodiments, the collection, processing, and use of the data in this manner is performed via one or more processors depicted in FIG. 1, such as the processor 142 of the vehicle 100 and/or the processor 173 of the remote server 170 of FIG. 1.

In various embodiments, each vehicle 100 comprises an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, such as aircraft, spacecraft, watercraft, and so on, and/or one or more other types of mobile platforms (e.g., a robot and/or other mobile platform).

In certain embodiments, the vehicle 100 (and/or other nearby vehicles) may be operated (including acceleration, deceleration, braking, steering, and so on) in whole or in part by a human drivers. Alternatively, in certain embodiments, such operation of the vehicle 100 may instead be provided in accordance with instructions provided by one or more processors (such as the processor 142 and/or the processor 173 as depicted in FIG. 1 and described in greater detail further below).

In the depicted embodiment, the vehicle 100 includes a body 104 that is arranged on a chassis 116. The body 104 substantially encloses other components of the vehicle 100. The body 104 and the chassis 116 may jointly form a frame. The vehicle 100 also includes a plurality of wheels 112. The wheels 112 are each rotationally coupled to the chassis 116 near a respective corner of the body 104 to facilitate movement of the vehicle 100. In one embodiment, the vehicle 100 includes four wheels 112, although this may vary in other embodiments (for example for trucks and certain other vehicles).

A drive system 110 is mounted on the chassis 116, and drives the wheels 112, for example via axles 114. The drive system 110 preferably comprises a propulsion system. In certain exemplary embodiments, the drive system 110 comprises an internal combustion engine and/or an electric motor/generator, coupled with a transmission thereof. In certain embodiments, the drive system 110 may vary, and/or two or more drive systems 110 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

As noted above, in certain embodiments, the vehicle 100 includes one or more functions that may be controlled automatically via the control system 102, for example in certain circumstances. In certain embodiments, some of the vehicles 100 may be operated by human drivers, whereas other of the vehicles 100 may be assisted and automated driving vehicles, for automated control of the drive system 110 and/or other vehicle components.

As depicted in FIG. 1, the vehicle 100 also includes a braking system 106 and a steering system 108 in various embodiments. In exemplary embodiments, the braking system 106 controls braking of the vehicle 100 using braking components that are controlled via inputs provided by a driver (e.g., via a braking pedal in certain embodiments) and/or automatically via the control system 102. Also in exemplary embodiments, the steering system 108 controls steering of the vehicle 100 via steering components (e.g., a steering wheel 109 that is part of a steering column coupled to the axles 114 and/or the wheels 112) that are controlled via inputs provided by a driver (e.g., via the steering wheel 109 in certain embodiments) and/or automatically via the control system 102.

In the embodiment depicted in FIG. 1, in certain embodiments, the control system 102 is coupled to the braking system 106, the steering system 108, and the drive system 110. In various embodiments, the control system 102 at least facilitates the generating, processing, and transmission of data for the vehicle 100, including as to fire events pertaining to the vehicle 100 (e.g., within the vehicle 100 and/or in proximity to the vehicle 100).

As depicted in FIG. 1, in various embodiments, the control system 102 includes a sensor array 120, a display 124 (e.g., including a display screen), a transceiver 126, and a controller 140.

In various embodiments, the sensor array 120 obtains sensor data pertaining to fire events that may affect the vehicle 100. In various embodiments, the sensor array 120 includes one or more tire sensors 130, temperature sensors 132, ultrasonic sensors 134, cameras 136, location sensors 137, and other sensors 138.

In certain embodiments, the tire sensors 130 including one or more tire pressure monitoring sensors ("TPM") sensors, for example that measure tire pressure and parameters relating thereto (e.g., a temperature and/or other values of or pertaining to one or more tires that are coupled to the wheels 112 of the vehicle 100). In certain embodiments, the tire sensors 130 are coupled to tires that are disposed on each wheel 112 of the vehicle 100, and the tire sensors 130 are thus located at each corner of the vehicle 100 (e.g., a front driver corner, a front passenger corner, a rear driver corner, and a rear passenger corner).

Also in certain embodiments, the temperature sensors 132 measure one or more temperature values of or pertaining to the vehicle 100. In certain embodiments, the temperature sensors 132 include both internal and external temperature sensors, and measure temperature values within the vehicle 100 (e.g., interior temperature) and/or outside the vehicle 100 (e.g., exterior temperature, such as ambient temperature). In certain embodiments, certain of the temperature sensors 132 may be part of and/or coupled to the tire sensors 130, whereas other of the temperature sensors 132 may be apart from and/or independent from the tire sensors 130. In certain embodiments, the temperature sensors 132 are located at each corner of the vehicle 100 (e.g., the front driver corner, the front passenger corner, the rear driver corner, and the rear passenger corner).

Also in certain embodiments, the ultrasonic sensors 134 collect ultrasonic sensor data as to the immediate surroundings in proximity to the vehicle 100, including other vehicles and other objects in proximity to the vehicle 100 (e.g., in the same parking lot). In certain embodiments, the ultrasonic sensors 134 are located at each corner of the vehicle 100 (e.g., the front driver corner, the front passenger corner, the rear driver corner, and the rear passenger corner).

Also in certain embodiments, the cameras 136 obtain camera data (e.g., still camera images and/or video camera images) of or pertaining to the vehicle 100. In certain embodiments, the cameras 136 include both internal and external cameras, and obtain camera images of within the vehicle 100 (e.g., interior camera images) and/or outside the vehicle 100 (e.g., exterior camera images, such as camera images of other vehicles, objects, and/or surroundings in proximity to the vehicle 100, such as in the same parking lot). In certain embodiments, the cameras 136 are located at each corner of the vehicle 100 (e.g., the front driver corner, the front passenger corner, the rear driver corner, and the rear passenger corner).

In addition, in certain embodiments, the location sensors 137 obtain location sensor data as to a position and/or location (e.g., a geographic position and/or location) of the vehicle 100. In certain embodiments, the location sensors 137 are part of and/or coupled to one or more global positioning systems (GPS), and/or other or more other satellite-based navigation and/or other location systems.

In certain embodiments, the other sensors 138 obtain other sensor data as to one or more other parameters pertaining to the vehicle 100. In certain embodiments, the other sensors 138 obtain information as to a transmission gear status (e.g., park, driver, reverse, or neutral) of the vehicle 100. In certain embodiments, the other sensors 138 may also obtain information as to user inputs for the vehicle 100 (e.g., a user request to move the vehicle 100, and so on), among other possible data pertaining to the vehicle.

In various embodiments, the vehicle 100 also includes a transceiver 126. In various embodiments, the transceiver 126 communicates with the remote server 170, the fire authorities 180, and/or data sources 190 pertaining to the data (including the sensor data from various sensors of the sensor array 120), fire determinations and warnings and instructions pertaining thereto, and/or the processing and implementation thereof.

In certain embodiments, the display 124 provides information for a driver and/or other passengers of the vehicle 100, for example as to fire events pertaining to the vehicle 100 (e.g., as to a fire within the vehicle 100 and/or in proximity to the vehicle 100), and/or for communicating instructions and/or controls from the user and/or the remote server 170 including those pertaining to operation of the vehicle 100 (e.g., for moving the vehicle 100, alerting one or more fire authorities 180, and so on).

In various embodiments, the controller 140 is coupled to the sensor array 120, as well as to the display 124 and the transceiver 126 (e.g., including for obtaining the sensor data, processing the sensor data, making determinations as to potential fire events, and transmitting the sensor data to the remote server 170, as well as for receiving and implementing instructions from the user and/or remote server 170 for movement of the vehicle 100, alerting the fire authorities 180, and so on).

In various embodiments, the controller 140 comprises a computer system, and includes a processor 142, a memory 144, an interface 146, a storage device 148, and a computer bus 149. In various embodiments, the controller (or computer system) 140 obtains sensor data from the sensor array 120, and in certain embodiments additional data via the transceiver 126 (e.g., from data sources 190 such as other vehicles, infrastructure, and/or other data sources). In various embodiments, the controller 140 processes the data, including the sensor data, makes determinations as to potential fire events pertaining to the vehicle 100, and provides appropriate warnings (e.g., to the users of the vehicle 100 and to other vehicles, and the fire authorities 180) and/or other actions (such as automated movement of the vehicle 100 and/or other vehicles, such as to move away from the fire event, protect the vehicle 100 and/or other vehicles from the fire event, provide access and/or proximity to emergency vehicles and/or personnel, and so on). In certain embodiments, the controller 140 also controls other operation and movement of the vehicle 100, such as acceleration, braking, steering, and/or other movement thereof, including during potential fire events as well as other events. In various embodiments, the controller 140 provides these and other functions in accordance with the steps of the processes and implementations depicted in FIGS. 2-4 and as described further below in connection therewith.

In various embodiments, the controller 140 (and, in certain embodiments, the control system 102 itself) is disposed within the body 104 of the vehicle 100. In one embodiment, the control system 102 is mounted on the chassis 116. In certain embodiments, the controller 140 and/or control system 102 and/or one or more components thereof may be disposed outside the body 104, for example on a remote server, in the cloud, or other device where image processing is performed remotely. In certain embodiments, the controller 140 of the vehicle 100 also performs functions in concert with the remote server 170, described further below.

It will be appreciated that the controller 140 may otherwise differ from the embodiment depicted in FIG. 1. For example, the controller 140 may be coupled to or may otherwise utilize one or more remote computer systems and/or other control systems, for example as part of one or more of the above-identified vehicle 100 devices and systems.

In the depicted embodiment, the computer system of the controller 140 includes a processor 142, a memory 144, an interface 146, a storage device 148, and a bus 149. The processor 142 performs the computation and control functions of the controller 140, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs 150 contained within the memory 144 and, as such, controls the general operation of the controller 140 and the computer system of the controller 140, generally in executing the processes described herein, such as the processes and implementations depicted in FIGS. 2-4 and as described further below in connection therewith.

The memory 144 can be any type of suitable memory. For example, the memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the processor 142. In the depicted embodiment, the memory 144 stores the above-referenced program 150 along one or more databases 155 (e.g., pertaining to the data) and other stored values 156 (e.g., including threshold values pertaining to potential fire events).

The bus 149 serves to transmit programs, data, status and other information or signals between the various components of the computer system of the controller 140. The interface 146 allows communication to the computer system of the controller 140, for example from a system driver and/or another computer system, and can be implemented using any suitable method and apparatus. In one embodiment, the interface 146 obtains the various data from the sensor array 120 and/or the navigation system 122. The interface 146 can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including various different types of direct access storage and/or other memory devices. In one exemplary embodiment, the storage device 148 comprises a program product from which memory 144 can receive a program 150 that executes one or more embodiments of the processes and implementations of FIGS. 2-4 and as described further below in connection therewith. In another exemplary embodiment, the program product may be directly stored in and/or otherwise accessed by the memory 144 and/or a secondary storage device (e.g., disk 157), such as that referenced below.

The bus 149 can be any suitable physical or logical means of connecting computer systems and components. This includes, but is not limited to, direct hard-wired connections, fiber optics, infrared and wireless bus technologies. During operation, the program 150 is stored in the memory 144 and executed by the processor 142.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 140 may also otherwise differ from the embodiment depicted in FIG. 1, for example in that the computer system of the controller 140 may be coupled to or may otherwise utilize one or more remote computer systems and/or other control systems.

With continued reference to FIG. 1, in various embodiments the vehicle 100 and the remote server 170 communicate via one or more communications networks 160. In various embodiments, the communications networks 160 may include one or more wireless communications networks (e.g., satellite-based, cellular, and/or any number of other different types of wireless communications networks).

Also in various embodiments, the remote server 170 is disposed remote from, or a significant physical distance from, each of the vehicles 100 (e.g., in a fleet). In various embodiments, as depicted in FIG. 1, the remote server 170 includes one or more transceivers 172, processors 173, and computer memory 174 storing a map database 176 of map locations along with stored values 178 (e.g., as to threshold values for possible fire events), along with a display 177 for displaying data (including as to potential fire events). In various embodiments, the transceiver 172 is utilized to communicate with the vehicle 100, including with respect to the data and the processing thereof and for the management and control thereof. In certain embodiments, the transceiver 172 is also configured to communicate with the fire authorities 180 and the data sources 190. As depicted in FIG. 1, the transceiver 172, processor 173, memory 174, database 176, stored values 178, and display 177 are similar or identical to the corresponding features of the vehicle 100 (e.g., as to the transceiver 126, processor 142, memory 144, database 155, stored values 156, and display 124 thereof). Also in certain embodiments, the processor 173 processes, or facilitates processing of, the data from the various vehicles 100 in the fleet, including providing warnings and actions pertaining to fire events pertaining to the vehicle 100 and/or other nearby vehicles (e.g., as described further below in connection with the processes and implementations of FIGS. 2-4).

Figure 2A:
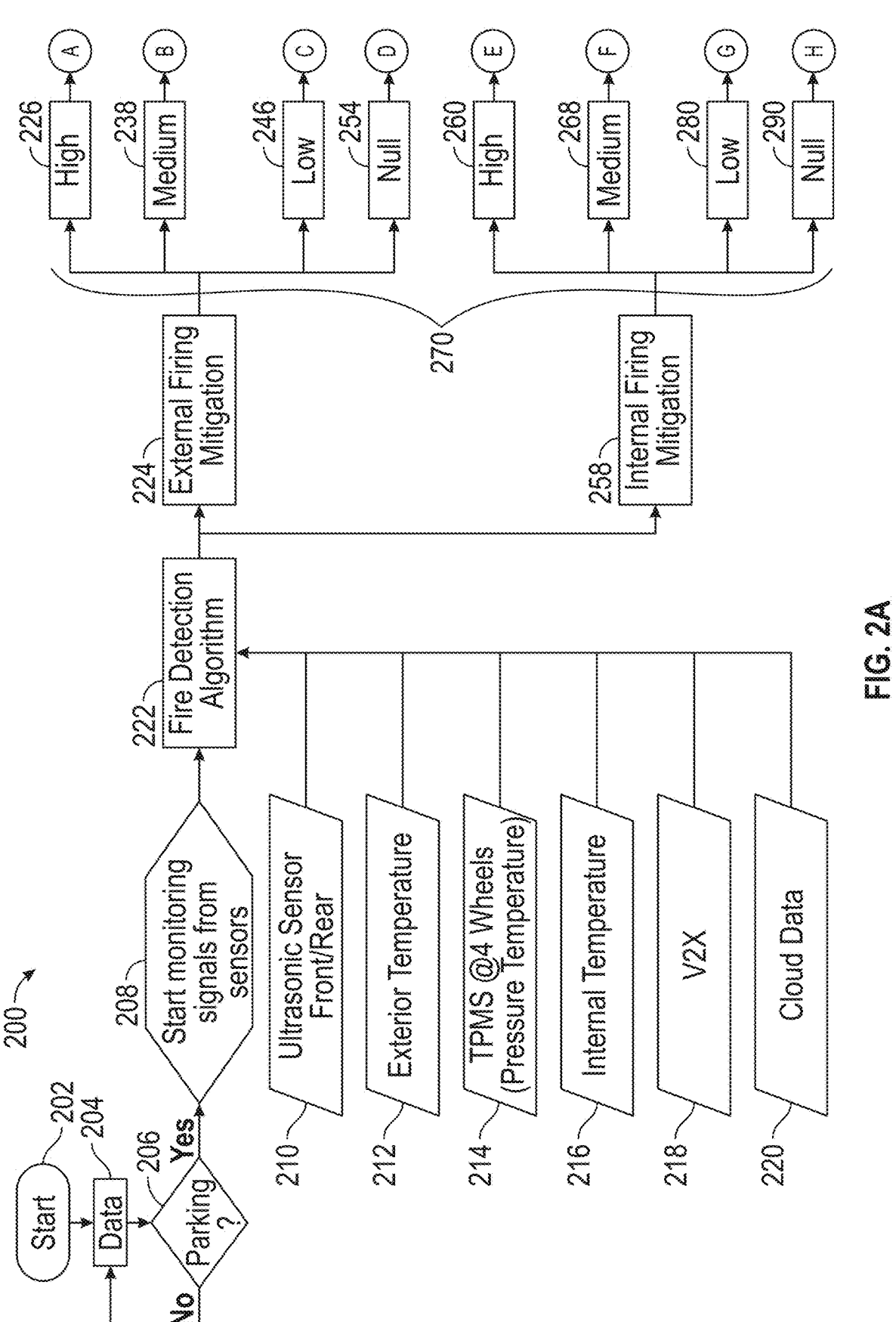
FIG. 2A and FIG. 2B (also collectively referred to herein as FIG. 2) collectively include a flowchart of a process for providing warnings and other actions pertaining to fire events pertaining to the vehicle and/or other nearby vehicles, and that can be implemented in connection with the vehicle and system of FIG. 1, in accordance with an exemplary embodiment.
Figure 2B:
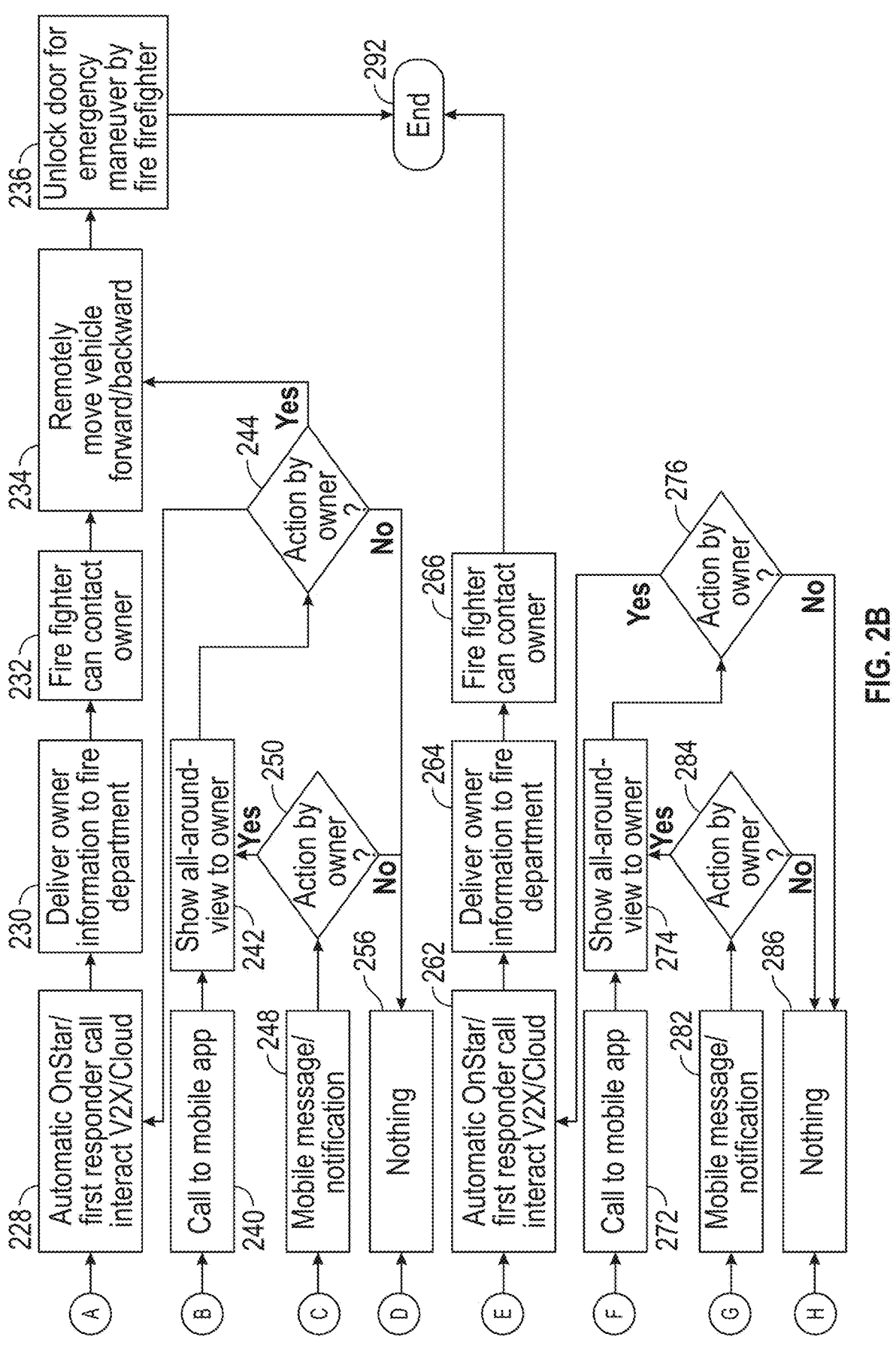

FIG. 2 is a flowchart of a process 200 for providing warnings and actions pertaining to fire events pertaining to vehicles, in accordance with an exemplary embodiment. In various embodiments, the process 200 can be implemented in connection with the system 10 of FIG. 1, including the vehicle 100 and its control system 102, the remote server 170, and other components of the system 10. The process 200 of FIG. 2 is described in greater detail below in connection with FIGS. 3 and 4, which provide exemplary illustrations of certain steps of the process of FIG. 2, namely (a) finding a location of the fire event (FIG. 3) and (b) determining a confidence level as to the prediction of a fire event (FIG. 4), in accordance with an exemplary embodiment.

As depicted in FIG. 2, in accordance with an exemplary embodiment, the process 200 begins at 202. In certain embodiments, the process 200 begins when a vehicle (such as the vehicle 100 of FIG. 1) begins operation. In certain other embodiments, the process 200 may begin when the vehicle approaches a parking lot, among other possibilities in different embodiments.

In certain embodiments, preliminary data is obtained (step 204). In certain embodiments, the preliminary data is obtained via one or more sensors of the sensor array 120 of FIG. 1, such as one or more other sensors 138 (e.g., a transmission gear sensor) and/or location sensors 137 (e.g., a GPS sensor and/or system), including as to operation of the vehicle and/or whether the vehicle is approaching lot.

In various embodiments, a determination is made as to whether the vehicle is parking (step 206). In various embodiments, this determination is made by a processor (such as the processor 142 of FIG. 1) using the preliminary data of step 204. For example, in certain embodiments, the vehicle may be determined to be parking when the vehicle is approaching a parking lot, and/or when the vehicle is approaching a final destination for the current vehicle drive, or the like.

In various embodiments, if it is determined in step 206 that the vehicle is not parking, then the process returns to step 204 in a new iteration as steps 204 and 206 repeat with updated preliminary sensor data. In various embodiments, once it is determined in an iteration of step 206 that the vehicle is parking, the process 200 then proceeds to step 208, described below.

In various embodiments, during step 208, monitoring is begun with respect to signals of other sensors of the sensor array 120, and also in certain embodiments with respect to information obtained via the transceiver 126 from the data sources 190 of FIG. 1. Specifically, in certain embodiments, monitoring is performed for each of the sensors of the sensor array 120, including tire sensors 130, temperature sensors 132, ultrasonic sensors 134, cameras 136, location sensors 137, and other sensors 138.

In certain embodiments, for example as part of the monitoring: (a) ultrasonic sensor data is obtained from the ultrasonic sensors 134 from both a front and rear of the vehicle, and in certain embodiments from all corners of the vehicle (step 210); (b) exterior temperature sensor data is obtained from the exterior temperature sensors of the temperature sensors 132 of FIG. 1 from both a front and rear of the vehicle, and in certain embodiments from all corners of the vehicle (step 212); (c) tire sensor data (e.g. including tire pressure and temperature) is obtained from the tire sensors 130 of FIG. 1 from both front and rear tires of the vehicle, and in certain embodiments from all tires (e.g., from all corners) of the vehicle (step 214); (d) interior temperature sensor data is obtained from the interior temperature sensors of the temperature sensors 132 of FIG. 1 from both a front and rear of the vehicle, and in certain embodiments from all corners of the vehicle (step 216) (e) other data is obtained from outside the vehicle, such as from other vehicles and/or infrastructure via the transceiver 126 of FIG. 1 (e.g., as to reports of events of other nearby vehicles, and so, and/or other data from other vehicles, infrastructure, and so on) (step 218); and/or (f) other data obtained from the cloud (e.g., from the transceiver of FIG. 1 from one or more other data sources 190 such as fire authorities, emergency communications systems, and so on) (step 220).

Figures 3, 4:
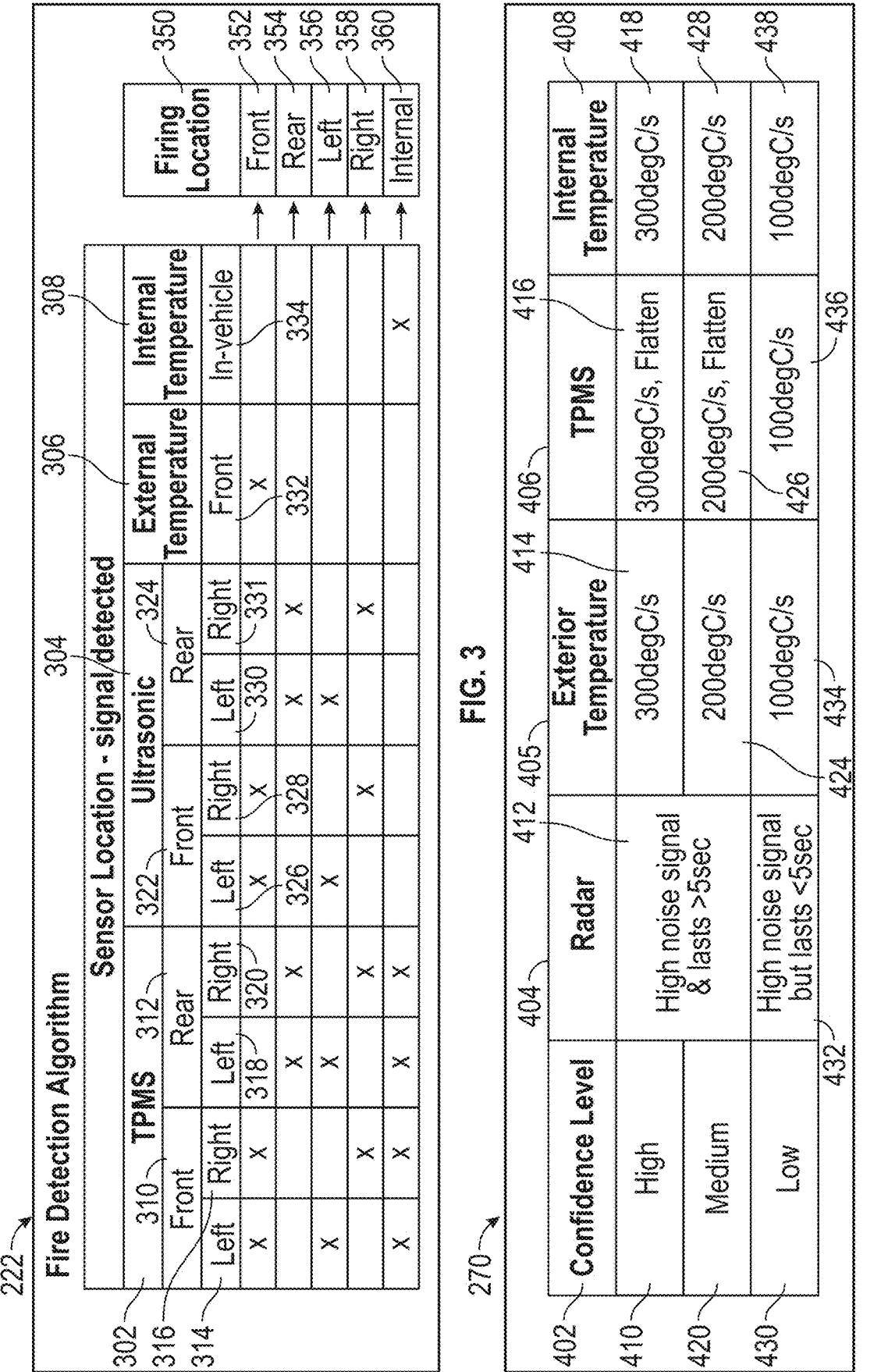
FIGS. 3 and 4 provide exemplary illustrations of certain steps of the process of FIG. 2, namely (a) finding a location of the fire event (FIG. 3) and (b) determining a confidence level as to the prediction of a fire event (FIG. 4), in accordance with an exemplary embodiment.

In various embodiments, a fire detection algorithm is performed (step 222). Specifically, in various embodiments, a processor (such as the processor 142 and/or processor 173 of FIG. 1) determines whether a potential fire event is occurring. In addition, in various embodiments, the processor also determines additional details as to the potential fire event, such as a predicted location of the potential fire event and a confidence level as to the determination of the fire event and/or its predicted location, among other possible details. An exemplary implementation of the fire detection algorithm of step 222 is depicted in FIG. 3 in accordance with an exemplary embodiment, and is described in greater detail further below in connection therewith.

In various embodiments, if the fire detection algorithm provides a prediction of an external fire event (i.e., outside the vehicle 100, but in proximity thereto, such as in the same parking lot), then external fire mitigation is initiated (step 224). In various embodiments the external fire event mitigation is dependent at least in part on a confidence level analysis 270 as to the fire event predictions. An exemplary implementation of the confidence level analysis 270 is depicted in FIG. 4 in accordance with an exemplary embodiment, and is described in greater detail further below in connection therewith. In various embodiments, the external fire mitigation of step 224, along with the confidence level analysis 270, are performed by a processor, such as the processor 142 and/or processor 173 of FIG. 1.

In various embodiments, following the initiation of the external fire mitigation in step 224, if there is determined to be a high level of confidence in the fire event predictions at 226, then a notification is provided to one or more fire authorities (step 228). In certain embodiments, the high level of confidence occurs when the fire event predictions indicate that the fire event is present with an amount of certainty that exceeds a first (highest) predetermined level of certainty. In various embodiments, notifications are provided to one or more fire authorities 180 of FIG. 1, such as a fire department, fire station, emergency personnel, first responders, and the like. In various embodiments, the notifications may be provided via instructions provided by one or more processors (such as the processor 142 and/or processor 173 of FIG. 1) that are implemented via one or more transceivers (such as the transceiver 126 and/or transceiver 172 of FIG. 1) via one or more communications networks (such as the communications network 160 of FIG. 1).

Also in various embodiments, information as to one or more users is provided to the fire authorities (step 230).

Specifically, in various embodiments, notifications are provided to one or more fire authorities 180 of FIG. 1, such as a fire department, fire station, emergency personnel, first responders, and the like, as to an identification of the vehicle and its user (e.g., driver or owner), along with contact information for the user. In various embodiments, the notifications may be provided via instructions provided by one or more processors (such as the processor 142 and/or processor 173 of FIG. 1) that are implemented via one or more transceivers (such as the transceiver 126 and/or transceiver 172 of FIG. 1) via one or more communications networks (such as the communications network 160 of FIG. 1).

Also in certain embodiments, one or more fire authorities contact the user (step 232). Specifically, in various embodiments, notifications are provided by one or more fire authorities 180 of FIG. 1, such as a fire department, fire station, emergency personnel, first responders, and the like, to the user (e.g., driver or owner) as to the nature of the predicted fire event. In various embodiments, the notifications may be provided via instructions provided by one or more processors, and may be delivered by way of example to the user via the display 124 of the vehicle 100 of FIG. 1, and/or to a smart phone, computer, or other electronic device of the user.

Also in certain embodiments, the vehicle is moved (step 234). Specifically, in various embodiments, the vehicle 100 (and/or one or more other vehicles in proximity thereto) may be moved, for example in order to (a) move the vehicle away from the fire event to protect; and/or (b) move the vehicle out of the way so that fire personnel can have easier access to the fire event, and so on. In various embodiments, the vehicle may be moved forward, backward, and/or to one side or another, and so on. In certain embodiments, the vehicle is moved in an autonomous manner in accordance with instructions provided by one or more processors. In other embodiments, the vehicle is moved by one or more humans, such as by the user and/or by fire personnel.

Also in certain embodiments, one or more doors of the vehicle are unlocked (step 236). Specifically, in various embodiments, one or more doors of the vehicle are unlocked so that fire personnel may gain easier access to the vehicle (for example, in performing the movement of step 234 and/or in performing one or more other operations with respect to the vehicle). In certain embodiments, the one or more doors are unlocked in an autonomous manner in accordance with instructions provided by one or more processors. In other embodiments, the unlocking of the doors may be performed by one or more humans, such as by the user and/or by fire personnel. In certain embodiments, the process 200 then ends at 292.

With reference back to step 224, following the initiation of the external fire mitigation in step 224, if there is instead determined to be a medium level of confidence in the fire event predictions at 238, then a notification is made to a user (e.g., an owner or driver) of the vehicle (step 240). In certain embodiments, the medium level of confidence occurs when the fire event predictions indicate that the fire event is present with an amount of certainty that exceeds a second predetermined level of certainty, but that is less than the first predetermined level of certainty of step 226. In various embodiments, notifications are provided via instructions provided by one or more processors, and may be delivered by way of example to the user via the display 124 of the vehicle 100 of FIG. 1, and/or to a smart phone (e.g., to an app on the user's phone), or via computer and/or other electronic device of the user.

Also in certain embodiments, a view is provided for the user (step 242). In various embodiments, an all-around view of the vehicle and its surroundings is provided using the camera images of the cameras 136 of FIG. 1. In various embodiments, the all-around view is provided via instructions provided by one or more processors, and may be delivered by way of example to the user via the display 124 of the vehicle 100 of FIG. 1, and/or to a smart phone (e.g., to an app on the user's phone), or via computer and/or other electronic device of the user.

Also in various embodiments, a determination is made as to whether an action is to be taken (step 244). In various embodiments, this comprises a determining as to whether the user is taking action or has confirmed that action should be taken, for example based on inputs provided by the user. In various embodiments, this determination is made by one or more processors based on inputs and/or other information provided by the user (e.g., by an input sensor that can comprise one of the other sensors 138 of FIG. 1 in certain embodiments).

In various embodiments, if it is determined in step 244 that action is to be taken, then the process 200 proceeds to the above-referenced step 234, in which the vehicle is moved. Conversely, if it is instead determined in step 244 that no user action is to be taken, then the proceed then proceeds to step 256, in which no mitigation actions are taken.

With reference back to step 224, following the initiation of the external fire mitigation in step 224, if there is instead determined to be a low level of confidence in the fire event predictions at 246, then a notification is made to a user (e.g., an owner or driver) of the vehicle (step 248). In certain embodiments, the low level of confidence occurs when the fire event predictions indicate that the fire event is present with an amount of certainty that exceeds a third predetermined level of certainty, but that is less than both the first predetermined level of certainty of step 226 and the second predetermined level of certainty of step 238. In various embodiments, notifications are provided via instructions provided by one or more processors, and may be delivered by way of example to the user via the display 124 of the vehicle 100 of FIG. 1, and/or to a smart phone (e.g., a text message or other notification on the user's phone), or via computer and/or other electronic device of the user.

Also in various embodiments, a determination is made as to whether an action is to be taken (step 250). In various embodiments, this comprises a determining as to whether the user is taking action or has confirmed that action should be taken, for example based on inputs provided by the user. In various embodiments, this determination is made by one or more processors based on inputs and/or other information provided by the user (e.g., by an input sensor that can comprise one of the other sensors 138 of FIG. 1 in certain embodiments).

In various embodiments, if it is determined in step 250 that action is to be taken, then the process 200 proceeds to the above-referenced step 242, in which a view (e.g., an all-around view) is provider for the user. Conversely, if it is instead determined in step 250 that no user action is to be taken, then the proceed then proceeds to the above-referenced step 256, in which no mitigation actions are taken.

With reference back to step 224, if there is instead determined to be no confidence in the fire event predictions at 254, then the process 200 proceeds to the above-referenced step 256, in which no mitigation actions are taken. In certain embodiments, the no confidence occurs when the fire event predictions indicate that the fire event is present with an amount of certainty that is equal to zero, or that is less than the third predetermined level of certainty of step 246.

With reference back to step 222, in various embodiments, if the fire detection algorithm provides a prediction of an internal fire event (i.e., inside or within the vehicle 100), then internal fire mitigation is initiated (step 258). In various embodiments the internal fire event mitigation is dependent at least in part on the confidence level analysis 270 as to the fire event predictions (for example, as described above).

In various embodiments, following the initiation of the internal fire mitigation in step 258, if there is determined to be a high level of confidence in the fire event predictions at 260, then a notification is provided to one or more fire authorities (step 262). In certain embodiments, the high level of confidence occurs when the fire event predictions indicate that the fire event is present with an amount of certainty that exceeds a first (highest) predetermined level of certainty (e.g., corresponding to step 226 above). In various embodiments, notifications are provided to one or more fire authorities 180 of FIG. 1, such as a fire department, fire station, emergency personnel, first responders, and the like. In various embodiments, the notifications may be provided via instructions provided by one or more processors (such as the processor 142 and/or processor 173 of FIG. 1) that are implemented via one or more transceivers (such as the transceiver 126 and/or transceiver 172 of FIG. 1) via one or more communications networks (such as the communications network 160 of FIG. 1).

Also in various embodiments, information as to one or more users is provided to the fire authorities (step 264). Specifically, in various embodiments, notifications are provided to one or more fire authorities 180 of FIG. 1, such as a fire department, fire station, emergency personnel, first responders, and the like, as to an identification of the vehicle and its user (e.g., driver or owner), along with contact information for the user. In various embodiments, the notifications may be provided via instructions provided by one or more processors (such as the processor 142 and/or processor 173 of FIG. 1) that are implemented via one or more transceivers (such as the transceiver 126 and/or transceiver 172 of FIG. 1) via one or more communications networks (such as the communications network 160 of FIG. 1).

Also in certain embodiments, one or more fire authorities contact the user (step 266). Specifically, in various embodiments, notifications are provided by one or more fire authorities 180 of FIG. 1, such as a fire department, fire station, emergency personnel, first responders, and the like, to the user (e.g., driver or owner) as to the nature of the predicted fire event. In various embodiments, the notifications may be provided via instructions provided by one or more processors, and may be delivered by way of example to the user via the display 124 of the vehicle 100 of FIG. 1, and/or to a smart phone, computer, or other electronic device of the user. In certain embodiments, the process 200 then terminates at 292.

With reference back to step 258, following the initiation of the internal fire mitigation in step 258, if there is instead determined to be a medium level of confidence in the fire event predictions at 268, then a notification is made to a user (e.g., an owner or driver) of the vehicle (step 272). In certain embodiments, the medium level of confidence occurs when the fire event predictions indicate that the fire event is present with an amount of certainty that exceeds a second predetermined level of certainty, but that is less than the first predetermined level of certainty of step 260 (e.g., corresponding to step 238 above). In various embodiments, notifications are provided via instructions provided by one or more processors, and may be delivered by way of example to the user via the display 124 of the vehicle 100 of FIG. 1, and/or to a smart phone (e.g., to an app on the user's phone), or via computer and/or other electronic device of the user.

Also in certain embodiments, a view is provided for the user (step 274). In various embodiments, an all-around view of the vehicle and its surroundings is provided using the camera images of the cameras 136 of FIG. 1. In various embodiments, the all-around view is provided via instructions provided by one or more processors, and may be delivered by way of example to the user via the display 124 of the vehicle 100 of FIG. 1, and/or to a smart phone (e.g., to an app on the user's phone), or via computer and/or other electronic device of the user.

Also in various embodiments, a determination is made as to whether an action is to be taken (step 276). In various embodiments, this comprises a determining as to whether the user is taking action or has confirmed that action should be taken, for example based on inputs provided by the user. In various embodiments, this determination is made by one or more processors based on inputs and/or other information provided by the user (e.g., by an input sensor that can comprise one of the other sensors 138 of FIG. 1 in certain embodiments).

In various embodiments, if it is determined in step 276 that action is to be taken, then the process 200 proceeds to the above-referenced step 262, in which a notification is provided to the user of the vehicle. Conversely, if it is instead determined in step 276 that no user action is to be taken, then the proceed then proceeds to step 286, in which no mitigation actions are taken.

With reference back to step 258, following the initiation of the internal fire mitigation in step 258, if there is instead determined to be a low level of confidence in the fire event predictions at 280, then a notification is made to a user (e.g., an owner or driver) of the vehicle (step 282). In certain embodiments, the low level of confidence occurs when the fire event predictions indicate that the fire event is present with an amount of certainty that exceeds a third predetermined level of certainty, but that is less than both the first predetermined level of certainty of step 260 and the second predetermined level of certainty of step 268 (e.g., corresponding to step 246 above). In various embodiments, notifications are provided via instructions provided by one or more processors, and may be delivered by way of example to the user via the display 124 of the vehicle 100 of FIG. 1, and/or to a smart phone (e.g., a text message or other notification on the user's phone), or via computer and/or other electronic device of the user.

Also in various embodiments, a determination is made as to whether an action is to be taken (step 284). In various embodiments, this comprises a determining as to whether the user is taking action or has confirmed that action should be taken, for example based on inputs provided by the user. In various embodiments, this determination is made by one or more processors based on inputs and/or other information provided by the user (e.g., by an input sensor that can comprise one of the other sensors 138 of FIG. 1 in certain embodiments).

In various embodiments, if it is determined in step 284 that action is to be taken, then the process 200 proceeds to the above-referenced step 274, in which a view (e.g., an all-around view) is provider for the user. Conversely, if it is instead determined in step 284 that no user action is to be taken, then the proceed then proceeds to the above-referenced step 286, in which no mitigation actions are taken.

With reference back to step 258, if there is instead determined to be no confidence in the fire event predictions at 290, then the process 200 proceeds to the above-referenced step 286, in which no mitigation actions are taken. In certain embodiments, the no confidence occurs when the fire event predictions indicate that the fire event is present with an amount of certainty that is equal to zero, or that is less than the third predetermined level of certainty of step 280 (e.g., corresponding to step 254 above).

The process 200 of FIG. 2 is described in greater detail below in connection with FIGS. 3 and 4, which provide exemplary illustrations of certain steps of the process of FIG. 2, namely (a) finding a location of the fire event (FIG. 3) and (b) determining a confidence level as to the prediction of a fire event (FIG. 4), in accordance with an exemplary embodiment.

With reference first to FIG. 3, an illustration is provided for the fire detection algorithm corresponding to step 222 of the process 200 of FIG. 2, in accordance with an exemplary embodiment. As depicted in FIG. 3, sensor values are obtained with respect to multiple different sensor modalities, including (a) tire pressure monitoring ("TPM") sensor data 302; (b) ultrasonic sensor data 304; (c) external temperature sensor data 306; and (d) internal temperature sensor data 308.

As depicted in FIG. 3, the TPM sensor data 302 includes front TPMS sensor data 310 as to a front portion (or end) of the vehicle, and rear TPMS sensor data 312 as a rear portion (or end) of the vehicle. In various embodiments, the front TPMS sensor data 310 includes front left TPMS sensor data 314 (i.e., at or near a front left corner of the vehicle, such as a front driver side corner of the vehicle) and front right TPMS sensor data 316 (i.e., at or near a front right corner of the vehicle, such as a front passenger side corner of the vehicle). Also in various embodiments, the rear TPMS sensor data 312 includes rear left TPMS sensor data 318 (i.e., at or near a rear left corner of the vehicle, such as a rear driver side corner of the vehicle) and rear right TPMS sensor data 320 (i.e., at or near a rear right corner of the vehicle, such as a rear passenger side corner of the vehicle).

Also as depicted in FIG. 3, the ultrasonic sensor data 304 includes front ultrasonic sensor data 322 as to a front portion (or end) of the vehicle, and rear ultrasonic sensor data 324 as a rear portion (or end) of the vehicle. In various embodiments, the front ultrasonic sensor data 322 includes front left ultrasonic sensor data 326 (i.e., at or near a front left corner of the vehicle, such as a front driver side corner of the vehicle) and front right ultrasonic sensor data 328 (i.e., at or near a front right corner of the vehicle, such as a front passenger side corner of the vehicle). Also in various embodiments, the rear ultrasonic sensor data 324 includes rear left ultrasonic sensor data 330 (i.e., at or near a rear left corner of the vehicle, such as a rear driver side corner of the vehicle) and rear right ultrasonic sensor data 331 (i.e., at or near a rear right corner of the vehicle, such as a rear passenger side corner of the vehicle).

Also as depicted in FIG. 3, in various embodiments the external temperature sensor data 306 includes front external temperature sensor data 332 (e.g., as to a front portion or end of the vehicle), among other possible external temperature data. In addition, in various embodiments, the internal temperature sensor data 308 includes in-vehicle temperature sensor data 334.

Also as depicted in FIG. 3, in various embodiments, the algorithm 222 provides a prediction of a location 350 of the fire event.

For example, as illustrated in FIG. 3, in certain embodiments, when a fire event is indicated by the various "front" data types (e.g., front left TPMS sensor data 314, front right TPMS sensor data 316, front left ultrasonic sensor data 326, and front right ultrasonic sensor data 328, along with the front external temperature sensor data 332, but not the other types of data of FIG. 3 (i.e., but not indicated by the various "rear" data types nor by the in-vehicle temperature sensor data 334), then in various embodiments the fire event is determined to be external and to a front side 352 of the vehicle (i.e., in front of the vehicle).

By way of additional example, also as illustrated in FIG. 3, in certain embodiments, when a fire event is indicated by the various "rear" data types (e.g., rear left TPMS sensor data 318, rear right TPMS sensor data 320, rear left ultrasonic sensor data 330, and rear right ultrasonic sensor data 331, but not the other types of data of FIG. 3 (i.e., but not indicated by the various "front" data types), then in various embodiments the fire event is determined to be external and to a rear side 354 of the vehicle (i.e., behind the vehicle).

By way of additional example, also as illustrated in FIG. 3, in certain embodiments, when a fire event is indicated by the various "left" data types (e.g., front left TPMS sensor data 314, rear left TPMS sensor data 318, front left ultrasonic sensor data 326, and rear left ultrasonic sensor data 330, but not the other types of data of FIG. 3 (i.e., but not indicated by the various "right" data types), then in various embodiments the fire event is determined to be external and to a left side 356 of the vehicle (i.e., beyond the driver side of the vehicle in certain embodiments).

By way of further example, also as illustrated in FIG. 3, in certain embodiments, when a fire event is indicated by the various "right" data types (e.g., front right TPMS sensor data 316, rear right TPMS sensor data 320, front right ultrasonic sensor data 328, and rear right ultrasonic sensor data 331, but not the other types of data of FIG. 3 (i.e., but not indicated by the various "left" data types), then in various embodiments the fire event is determined to be external and to a right side 358 of the vehicle (i.e., beyond the passenger side of the vehicle in certain embodiments).

By way of further example, also as illustrated in FIG. 3, in certain embodiments, when a fire event is indicated by each of the TPMS sensor data 302 of FIG. 3, and the in-vehicle temperature sensor data 334, but none of the other sensor data of FIG. 3 (i.e., not by the ultrasonic sensor data 304 nor the external temperature sensor data 306 of FIG. 3), then in various embodiments the fire event is determined to be internal 360 to the vehicle, in other words within or inside the vehicle.

With reference first to FIG. 4, an illustration is provided for the confidence level prediction corresponding to step 270 of the process 200 of FIG. 2 (including decisions 226, 238, 246, 254, 260, 268, 280, and 290), in accordance with an exemplary embodiment. As depicted in FIG. 4, in various embodiments a confidence level 402 is assigned based on parameters that include ultrasonic sensor data 404, exterior temperature sensor data 405, TPMS sensor data 406, and internal temperature sensor data 408.

Also as depicted in FIG. 4, in certain embodiments a high confidence level 410 is consistent with the following: (a) a high noise level of the ultrasonic sensor data 404 (greater than a noise level threshold) that lasts for more than a predetermined amount of time (e.g., five seconds, in one exemplary embodiment) (collectively referred to as condition 412); (b) a high exterior temperature sensor data 405 value (e.g., greater than 300 degrees Celsius in one embodiment) (condition 414); (c) a high TPMS value sensor data 406 value (e.g., greater than 300 degrees Celsius per second in one embodiment) (condition 416); and (d) a high internal temperature sensor data 408 value (e.g., greater than 300 degrees Celsius per second in one embodiment) (condition 418).

Also as depicted in FIG. 4, in certain embodiments a medium confidence level 420 is consistent with the following: (a) the high noise level of the ultrasonic sensor data 404 of condition 412 described above; (b) a medium exterior temperature sensor data 405 value (e.g., approximately 200 degrees Celsius in one embodiment) (condition 424); (c) a medium TPMS value sensor data 406 value (e.g., around 200 degrees Celsius per second in one embodiment) (condition 426); and (d) a medium internal temperature sensor data 408 value (e.g., approximately 200 degrees Celsius per second in one embodiment) (condition 428).

Finally, also as depicted in FIG. 4, in certain embodiments a low confidence level 430 is consistent with the following: (a) a high noise level of the ultrasonic sensor data 404 but that lasts for less than the predetermined amount of time of condition 412 described above (i.e., denoted as condition 432); (b) a low exterior temperature sensor data 405 value (e.g., approximately 100 degrees Celsius in one embodiment) (condition 434); (c) a low TPMS value sensor data 406 value (e.g., around 100 degrees Celsius per second in one embodiment) (condition 436); and (d) a low internal temperature sensor data 408 value (e.g., approximately 100 degrees Celsius per second in one embodiment) (condition 438).

Accordingly, methods, systems, and vehicles are provided for providing notifications and warnings as to potential fire events pertaining to vehicles. In various embodiments, sensor data is utilized, along with other data, to predict fire events that may be occurring within a vehicle or in proximity to the vehicle (e.g., in a parking lot in which the vehicle is parked). In various embodiments, notifications and actions are taken as appropriate based on the predicted fire events, including based on a predicted location of the fire event as well as a calculated likelihood in the prediction of the fire event.

It will be appreciated that the systems, vehicles, and methods may vary from those depicted in the Figures and described herein. For example, the system 10 of FIG. 1, including the vehicle 100 and the remote server 170 of FIG. 1 and components thereof, may differ from that depicted in FIG. 1. It will similarly be appreciated that the steps of the processes and implementations of FIGS. 2-4 may differ from those depicted in the Figures, and/or that various steps may occur concurrently and/or in a different order than that depicted in the Figures.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising:

obtaining, via one or more vehicle sensors of a vehicle, preliminary sensor data pertaining to the vehicle and its surroundings;

determining, via a processor that is coupled to the one or more vehicle sensors, using the preliminary sensor data, whether the vehicle is parking at a parking lot; and when it is determined that the vehicle is parking in a parking lot, then:

obtaining additional sensor data via the one or more vehicle sensors as to the vehicle and its surroundings, including additional sensor data of a plurality of different modalities, including tire pressure monitoring sensor data, ultrasonic sensor data, exterior temperature sensor data, and interior temperature sensor data;

determining, via the processor, a confidence level as to whether a fire event is occurring within the parking lot, using the additional sensor data, wherein the confidence level is based on each of the plurality of different modalities, including the tire pressure monitoring sensor data, the ultrasonic sensor data, exterior temperature sensor data, and the interior temperature sensor data, wherein the confidence level is selected from one of the following:

a high confidence level that is consistent with the following: (a) a high noise level of the ultrasonic sensor data that is greater than a noise level threshold and that lasts for more than a predetermined amount of time; a high exterior temperature sensor data value that is greater than a first temperature threshold; (c) a high TPMS value sensor data 406 value that is greater than the first temperature threshold per second; and (d) a high internal temperature sensor data value that is greater than the first temperature threshold;

a medium confidence level that is consistent with the following: (a) the high noise level of the ultrasonic sensor data that is greater than the noise level threshold and that lasts for more than the predetermined amount of time; (b) a medium exterior temperature sensor data value that is less than the first temperature threshold and greater than a second temperature threshold; (c) a medium TPMS value sensor data value that is less than the first temperature threshold and greater than the second temperature threshold; and (d) a medium internal temperature sensor data value that is less than the first temperature threshold and greater than the second temperature threshold; and a low confidence level that is consistent with the following: (a) a high noise level of the ultrasonic sensor data but that lasts for less than the predetermined amount of time; (b) a low exterior temperature sensor data value that is less than the second predetermined threshold; (c) a low TPMS value sensor data value that is less than the second predetermined threshold per second; and (d) a low internal temperature sensor data value that is less than the second predetermined threshold; and taking an action for automatically controlling the vehicle via the processor, based on the confidence level that the fire event is occurring within the parking lot, including by automatically moving the vehicle, in accordance with instructions provided by the processor.

2. The method of claim 1, further comprising:

determining, via the processor, whether the fire event is occurring within the vehicle or outside from the vehicle;

wherein the action, including the automatic moving of the vehicle in accordance with the instructions provided by the processor, is based at least in part on whether the fire event is determined to be occurring within the vehicle or outside the vehicle.

3. The method of claim 2, further comprising:

determining, via the processor, a direction of the fire event with respect to the vehicle, when it is determined that the fire event is occurring outside the vehicle;

wherein the action, including the automatic moving of the vehicle in accordance with the instructions provided by the processor, is based at least in part on the direction of the fire event with respect to the vehicle.

4. The method of claim 1, wherein the step of taking the action further comprises providing a notification regarding the fire event to a fire authority in addition to a user of the vehicle.

5. A system comprising:

one or more vehicle sensors of a vehicle, the one or more vehicle sensors configured to obtain sensor data pertaining to the vehicle and its surroundings, including preliminary sensor data, and further including additional sensor data of a plurality of different modalities, including tire pressure monitoring sensor data, ultrasonic sensor data, exterior temperature sensor data, and interior temperature sensor data; and a processor that is coupled to the one or more vehicle sensors and that is configured to at least facilitate:

determining, using the preliminary sensor data, whether the vehicle is parking at a parking lot; and when it is determined that the vehicle is parking in a parking lot, then:

determining a confidence level as to whether a fire event is occurring within the parking lot, using the additional sensor data, wherein the confidence level is based on each of the plurality of different modalities, including the tire pressure monitoring sensor data, the ultrasonic sensor data, exterior temperature sensor data, and the interior temperature sensor data, wherein the confidence level is selected from one of the following:

a high confidence level that is consistent with the following: (a) a high noise level of the ultrasonic sensor data that is greater than a noise level threshold and that lasts for more than a predetermined amount of time; a high exterior temperature sensor data value that is greater than a first temperature threshold; (c) a high TPMS value sensor data 406 value that is greater than the first temperature threshold per second; and (d) a high internal temperature sensor data value that is greater than the first temperature threshold;

a medium confidence level that is consistent with the following: (a) the high noise level of the ultrasonic sensor data that is greater than the noise level threshold and that lasts for more than the predetermined amount of time; (b) a medium exterior temperature sensor data value that is less than the first temperature threshold and greater than a second temperature threshold; (c) a medium TPMS value sensor data value that is less than the first temperature threshold and greater than the second temperature threshold; and (d) a medium internal temperature sensor data value that is less than the first temperature threshold and greater than the second temperature threshold; and a low confidence level that is consistent with the following: (a) a high noise level of the ultrasonic sensor data but that lasts for less than the predetermined amount of time; (b) a low exterior temperature sensor data value that is less than the second predetermined threshold; (c) a low TPMS value sensor data value that is less than the second predetermined threshold per second; and (d) a low internal temperature sensor data value that is less than the second predetermined threshold; and taking an action for automatically controlling the vehicle via the processor, including by automatically moving the vehicle in accordance with instructions provided by the processor, based on the confidence level that the fire event is occurring within the parking lot.

6. The system of claim 5, wherein the processor is further configured to at least facilitate:

determining whether the fire event is occurring within the vehicle or outside from the vehicle;

wherein the action, including the automatic moving of the vehicle in accordance with the instructions provided by the processor, is based at least in part on whether the fire event is determined to be occurring within the vehicle or outside the vehicle.

7. The system of claim 6, wherein the processor is further configured to at least facilitate:

determining a direction of the fire event with respect to the vehicle, when it is determined that the fire event is occurring outside the vehicle;

wherein the action, including the automatic moving of the vehicle in accordance with the instructions provided by the processor, is based at least in part on the direction of the fire event with respect to the vehicle.

8. A vehicle comprising:

a body;

a drive system configured to move the body;

one or more vehicle sensors of a vehicle, the one or more vehicle sensors configured to obtain sensor data pertaining to the vehicle and its surroundings, including preliminary sensor data, and further including additional sensor data of a plurality of different modalities, including tire pressure monitoring sensor data, ultrasonic sensor data, exterior temperature sensor data, and interior temperature sensor data; and a processor that is coupled to the one or more sensors and that is configured to at least facilitate:

determining, using the preliminary sensor data, whether the vehicle is parking at a parking lot; and when it is determined that the vehicle is parking in a parking lot, then:

determining a confidence level as to whether a fire event is occurring in proximity to the parking lot, using the additional sensor data, wherein the confidence level is based on each of the plurality of different modalities, including the tire pressure monitoring sensor data, the ultrasonic sensor data, exterior temperature sensor data, and the interior temperature sensor data, wherein the confidence level is selected from one of the following:

a high confidence level that is consistent with the following: (a) a high noise level of the ultrasonic sensor data that is greater than a noise level threshold and that lasts for more than a predetermined amount of time; a high exterior temperature sensor data value that is greater than a first temperature threshold; (c) a high TPMS value sensor data 406 value that is greater than the first temperature threshold per second; and (d) a high internal temperature sensor data value that is greater than the first temperature threshold;

a medium confidence level that is consistent with the following: (a) the high noise level of the ultrasonic sensor data that is greater than the noise level threshold and that lasts for more than the predetermined amount of time; (b) a medium exterior temperature sensor data value that is less than the first temperature threshold and greater than a second temperature threshold; (c) a medium TPMS value sensor data value that is less than the first temperature threshold and greater than the second temperature threshold; and (d) a medium internal temperature sensor data value that is less than the first temperature threshold and greater than the second temperature threshold; and a low confidence level that is consistent with the following: (a) a high noise level of the ultrasonic sensor data but that lasts for less than the predetermined amount of time; (b) a low exterior temperature sensor data value that is less than the second predetermined threshold; (c) a low TPMS value sensor data value that is less than the second predetermined threshold per second; and (d) a low internal temperature sensor data value that is less than the second predetermined threshold; and taking an action for automatically controlling the vehicle via the processor, including by automatically moving the vehicle in accordance with instructions provided by the processor, based on the confidence level that the fire event is occurring within the parking lot.

9. The vehicle of claim 8, wherein the processor is further configured to at least facilitate:

determining whether the fire event is occurring within the vehicle or outside from the vehicle; and determining a direction of the fire event with respect to the vehicle, when it is determined that the fire event is occurring outside the vehicle;

wherein the action, including the automatic moving of the vehicle in accordance with the instructions provided by the processor, is based at least in part on whether the fire event is determined to be occurring within the vehicle or outside the vehicle and also based at least in part on the direction of the fire event with respect to the vehicle; and wherein the action further comprises providing a notification to a fire authority in addition to a user of the vehicle.

10. The method of claim 1, wherein the vehicle comprises an automobile.

11. The method of claim 1, wherein the action comprises automatically moving the vehicle away from the fire event to protect the vehicle, in accordance with the instructions provided by the processor.

12. The method of claim 1, wherein the action comprises automatically moving the vehicle out of the way of fire personnel who are to access the fire, in accordance with the instructions provided by the processor.

13. The method of claim 1, wherein the action further comprises automatically unlocking of one or more of the doors of the vehicle, thereby facilitating access via fire personnel.

\* \* \* \* \*